United States Patent
Lee

(10) Patent No.: US 10,048,818 B2
(45) Date of Patent: Aug. 14, 2018

(54) TOUCH PANEL INCLUDING MICRO-PATTERNS FOR IMPROVEMENT OF VISIBILITY

(71) Applicant: G2TOUCH Co., LTD, Seongnam (KR)

(72) Inventor: Sung Ho Lee, Hwaseong (KR)

(73) Assignee: G2TOUCH CO., LTD, Seongnam (KR)

( * ) Notice: Subject to any disclaimer, the term of this patent is extended or adjusted under 35 U.S.C. 154(b) by 109 days.

(21) Appl. No.: 15/194,394

(22) Filed: Jun. 27, 2016

(65) Prior Publication Data
US 2017/0010715 A1   Jan. 12, 2017

(30) Foreign Application Priority Data
Jul. 6, 2015 (KR) .................. 10-2015-0095748

(51) Int. Cl.
*G06F 3/041* (2006.01)
*G06F 3/044* (2006.01)

(52) U.S. Cl.
CPC .... *G06F 3/044* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 2009/0073135 A1 | 3/2009 | Lin et al. | |
| 2014/0168092 A1 | 6/2014 | Yilmaz | |
| 2014/0240110 A1* | 8/2014 | Suzuki | G06F 3/041 340/407.1 |
| 2015/0049053 A1* | 2/2015 | Kim | G06F 3/044 345/174 |
| 2015/0220181 A1* | 8/2015 | Jung | G06F 3/044 345/174 |
| 2016/0274727 A1* | 9/2016 | Nakamura | G06F 3/044 |

FOREIGN PATENT DOCUMENTS

| | | |
|---|---|---|
| JP | 2014-199606 A | 10/2014 |
| JP | 2015-106240 A | 6/2015 |
| KR | 10-2014-0121658 A | 10/2014 |
| KR | 10-2014-0122395 A | 10/2014 |
| KR | 10-1473187 B1 | 12/2014 |
| KR | 10-2015-0042437 A | 4/2015 |
| TW | 200945149 A | 11/2009 |
| TW | 201044051 A | 12/2010 |

\* cited by examiner

*Primary Examiner* — Joseph Haley

(57) ABSTRACT

The present invention relates to a touch panel capable of detecting a capacitive touch input of a finger of a human body or a touch input tool having conduction characteristics similar to those of the finger, and more particularly, to a structure of a touch panel having a high resolution so as to detect a touch input tool having a diameter smaller than a unit pi. In a touch panel having a high resolution according to an exemplary embodiment of the present invention, it is possible to maintain high touch sensitivity while minimizing a change in structures of touch patterns depending on a size or a purpose of the touch panel.

18 Claims, 15 Drawing Sheets

[FIG. 1A]
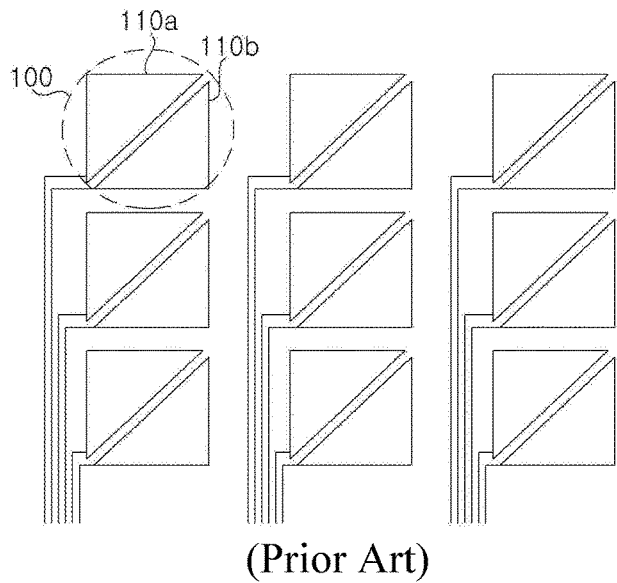
(Prior Art)
[FIG. 1B]
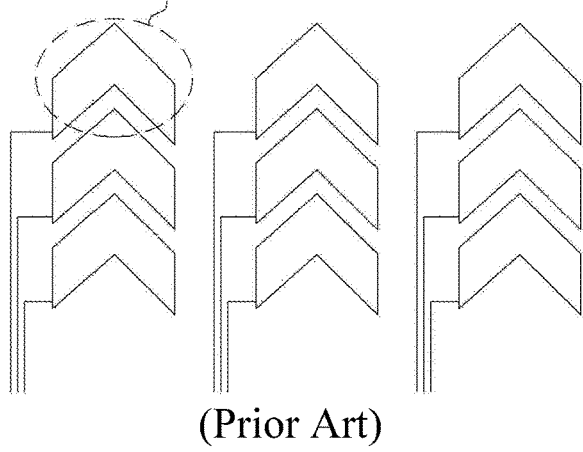
(Prior Art)
[FIG. 1C]
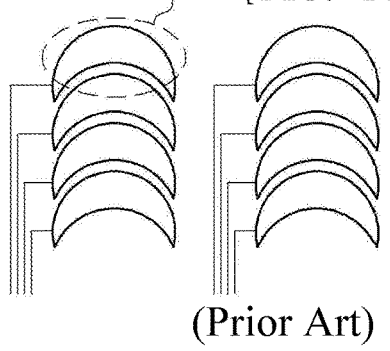
(Prior Art)

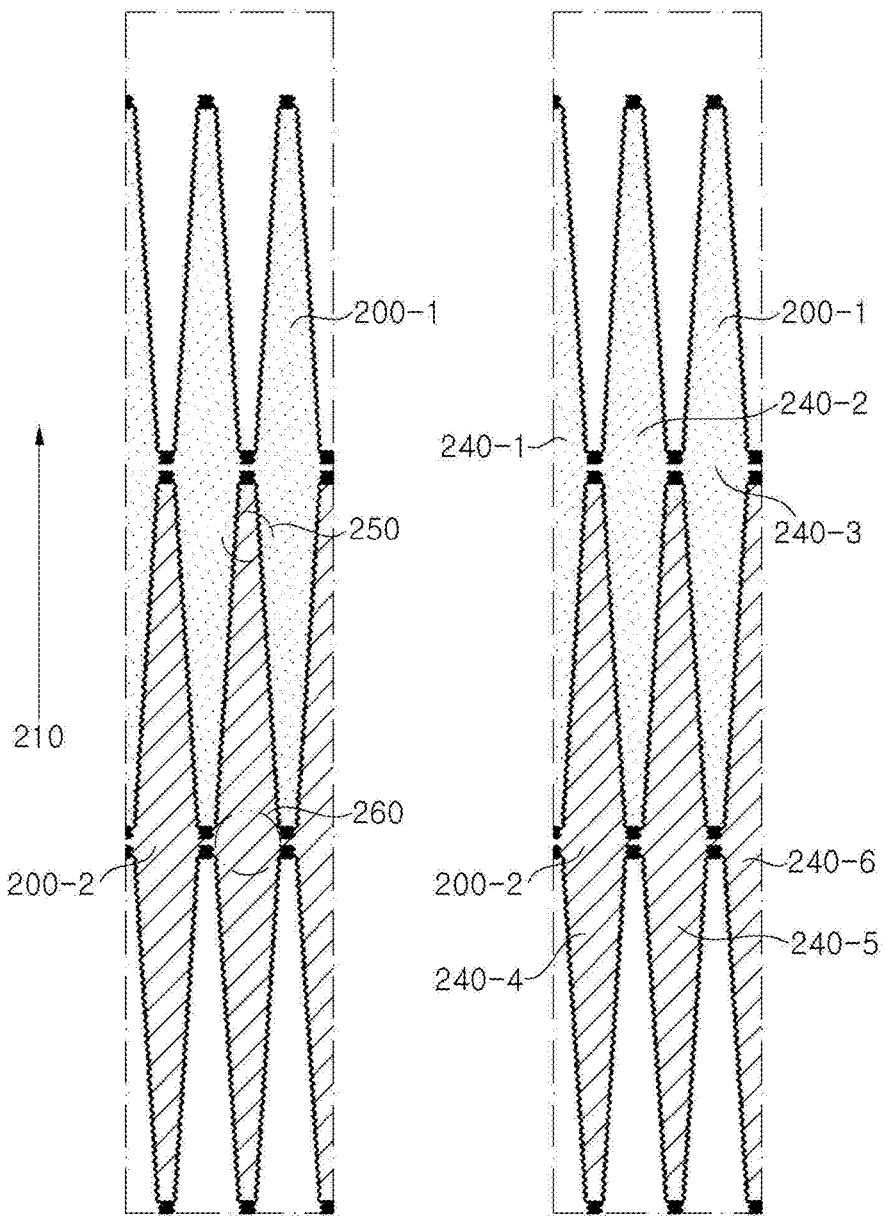
[FIG. 2A]  [FIG. 2B]

[FIG 3]
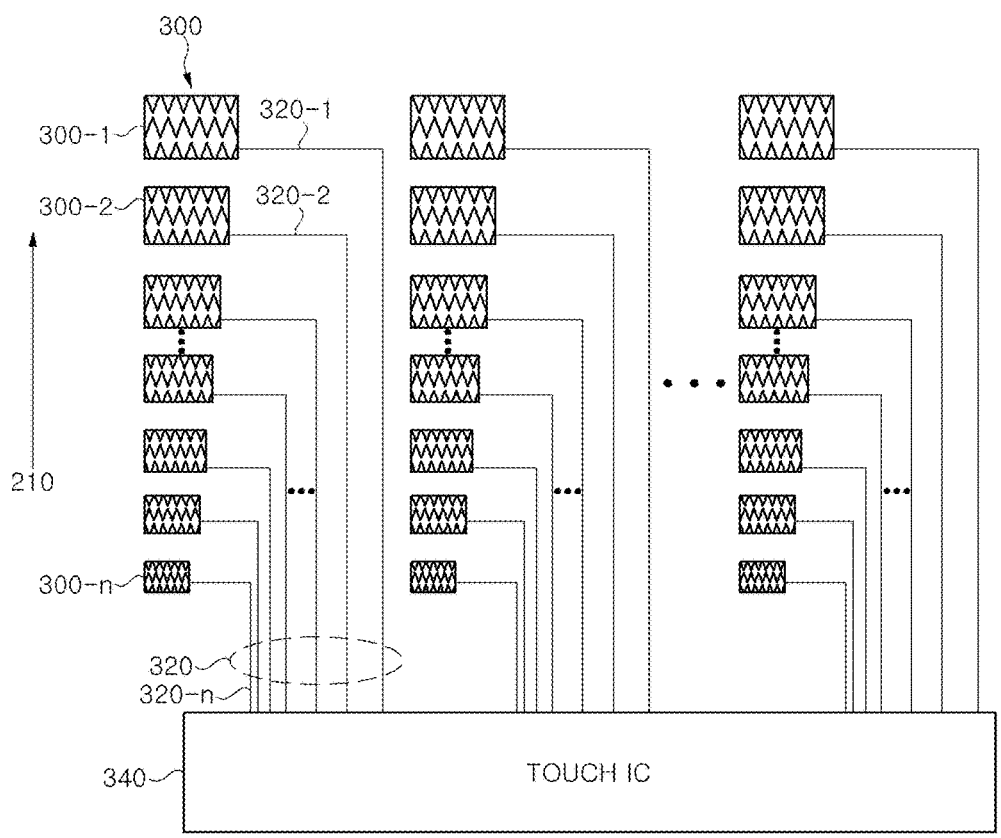

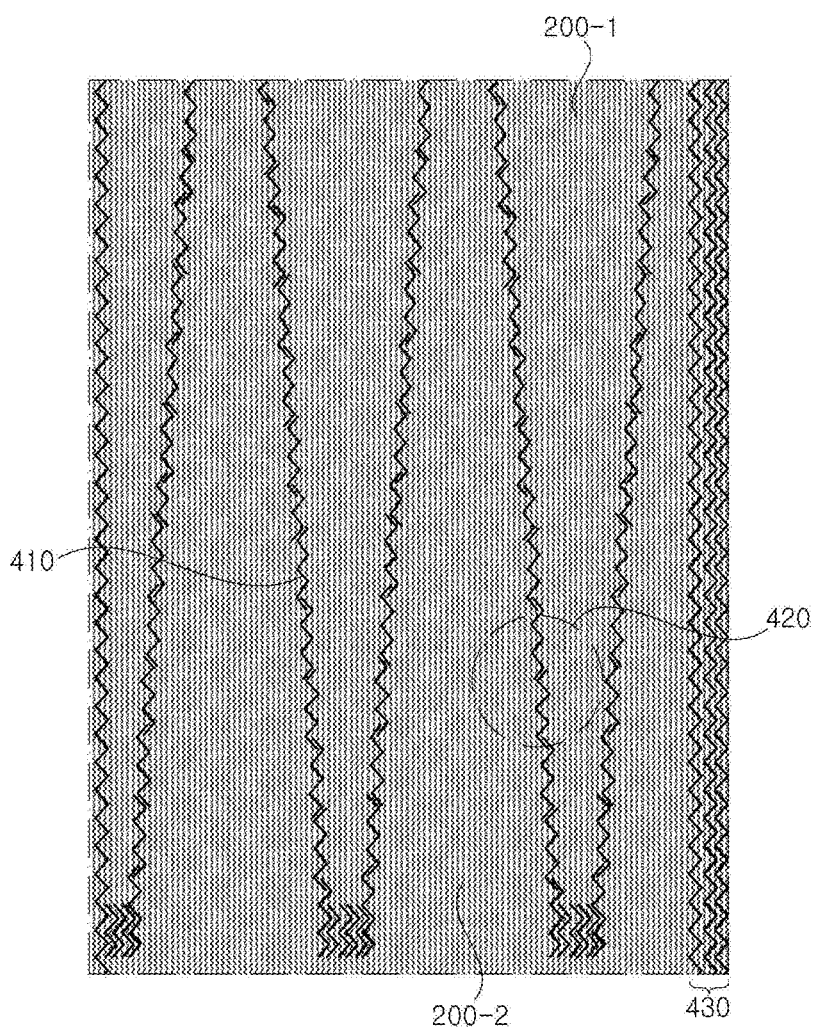
[FIG. 4A]

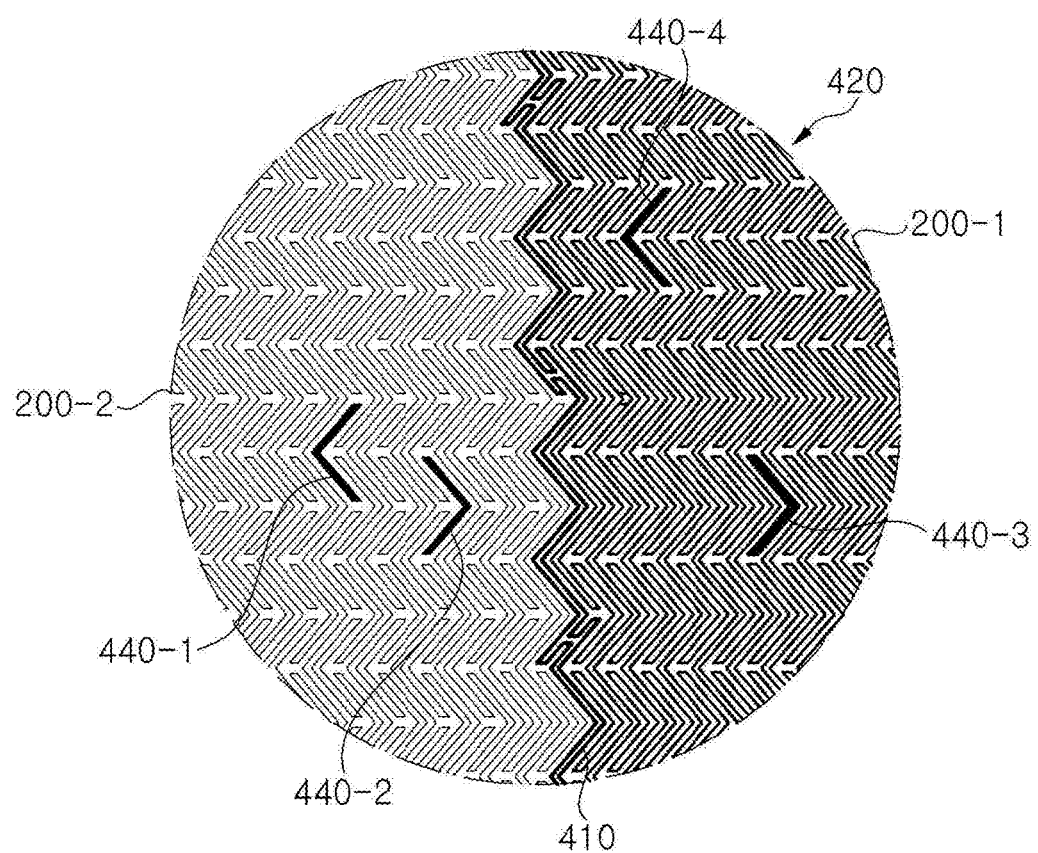
[FIG. 4B]

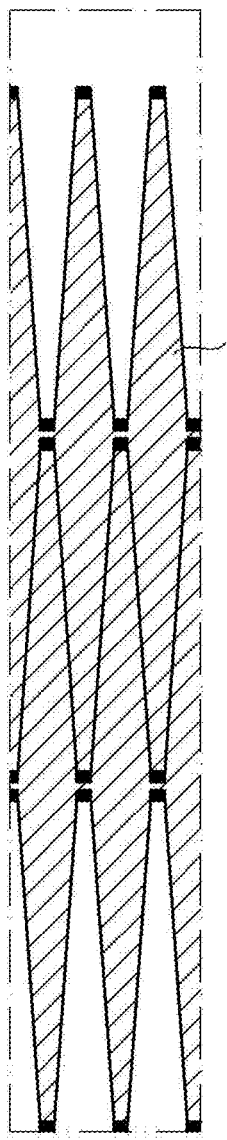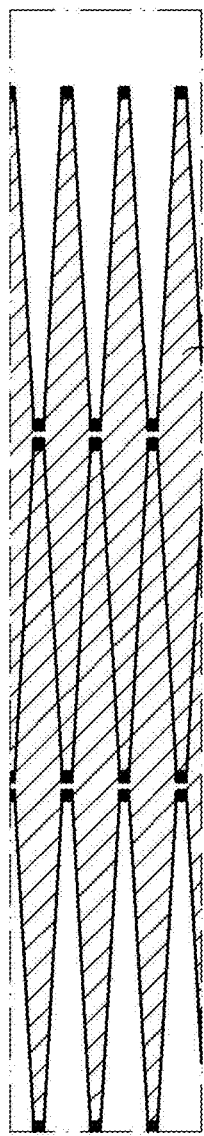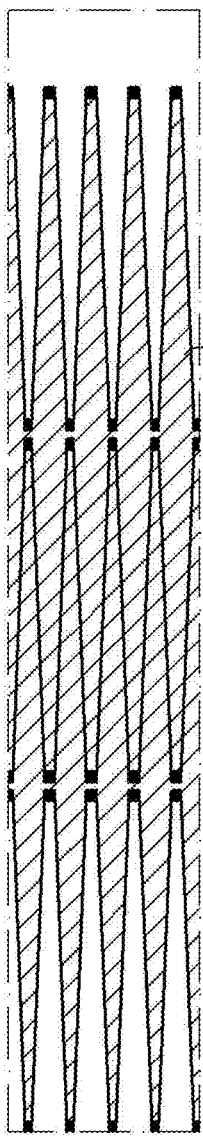
[FIG. 5A]   [FIG. 5B]   [FIG. 5C]

[FIG 6]
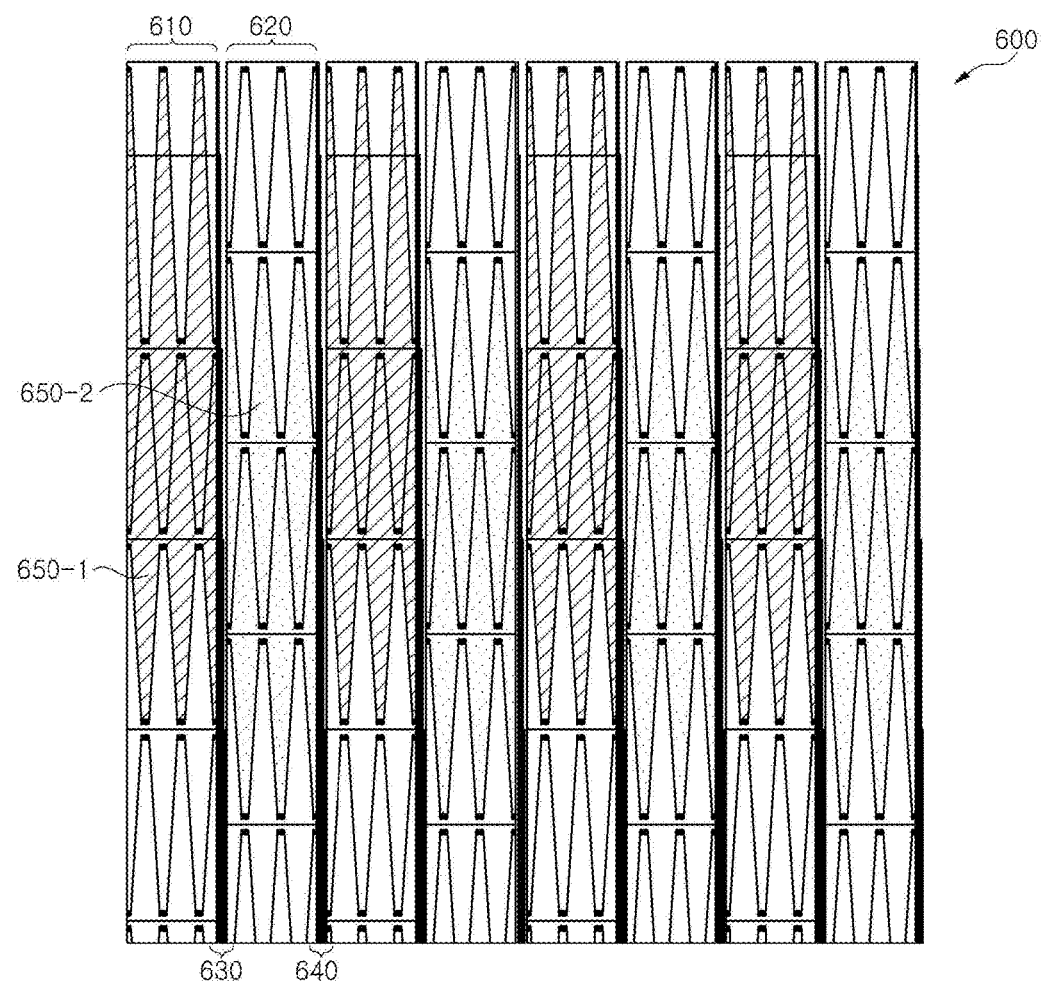

[FIG 7]
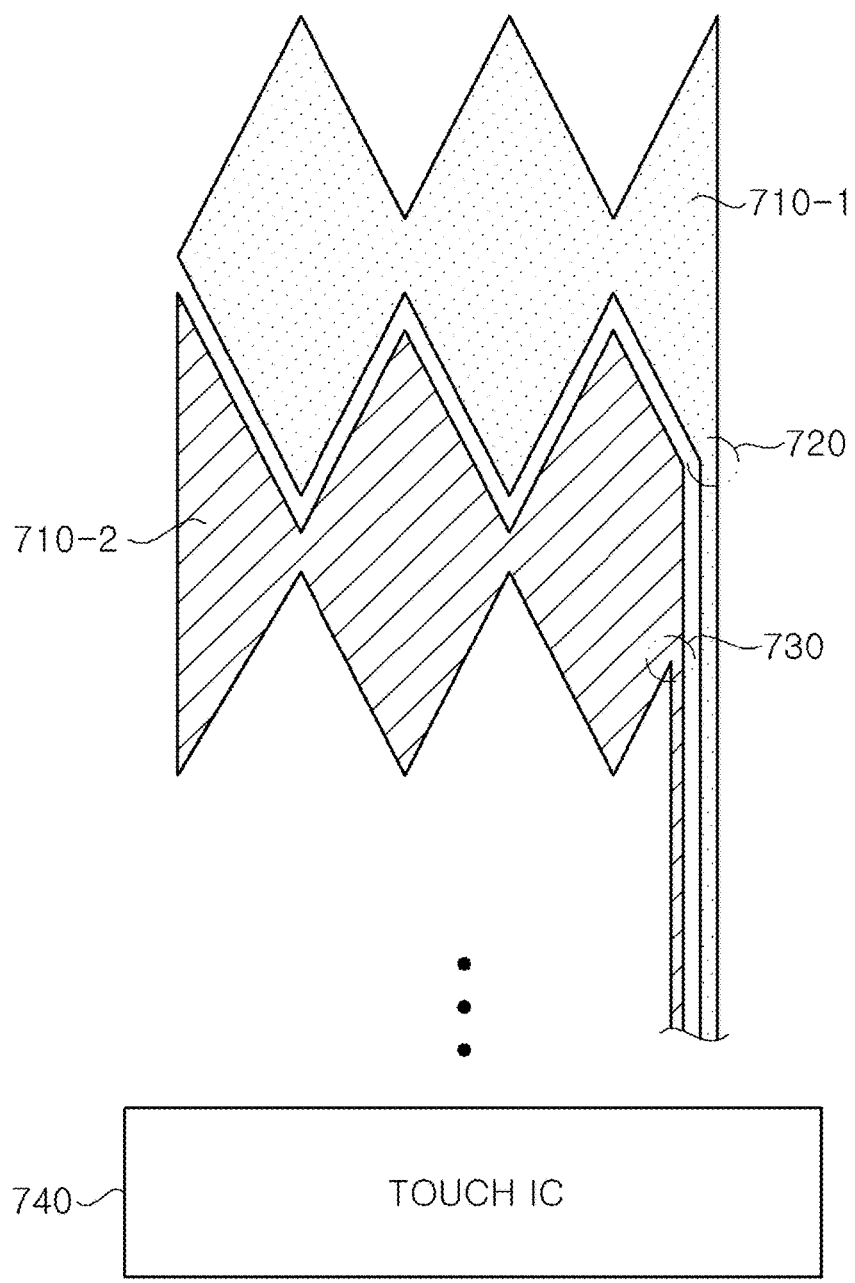

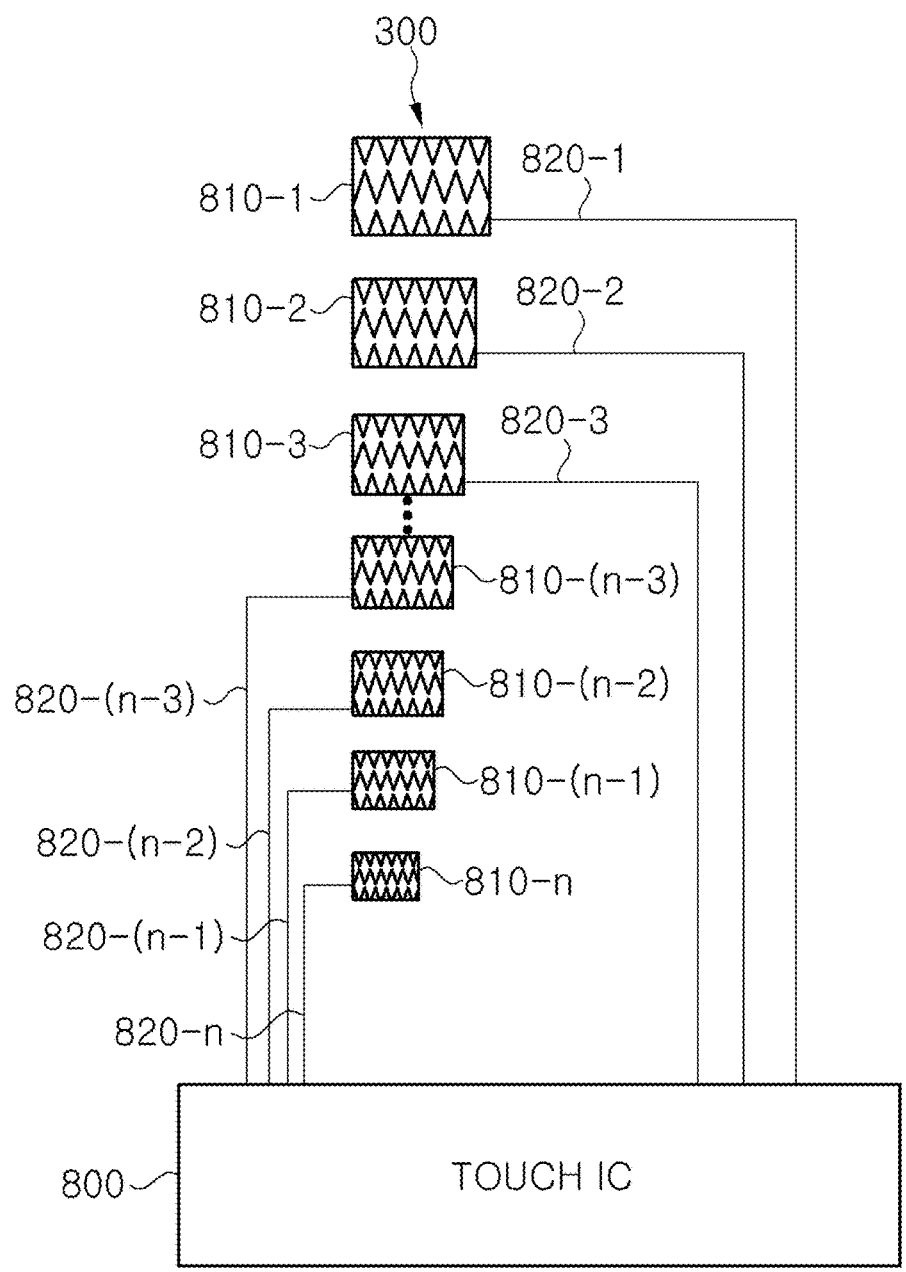
[FIG. 8A]

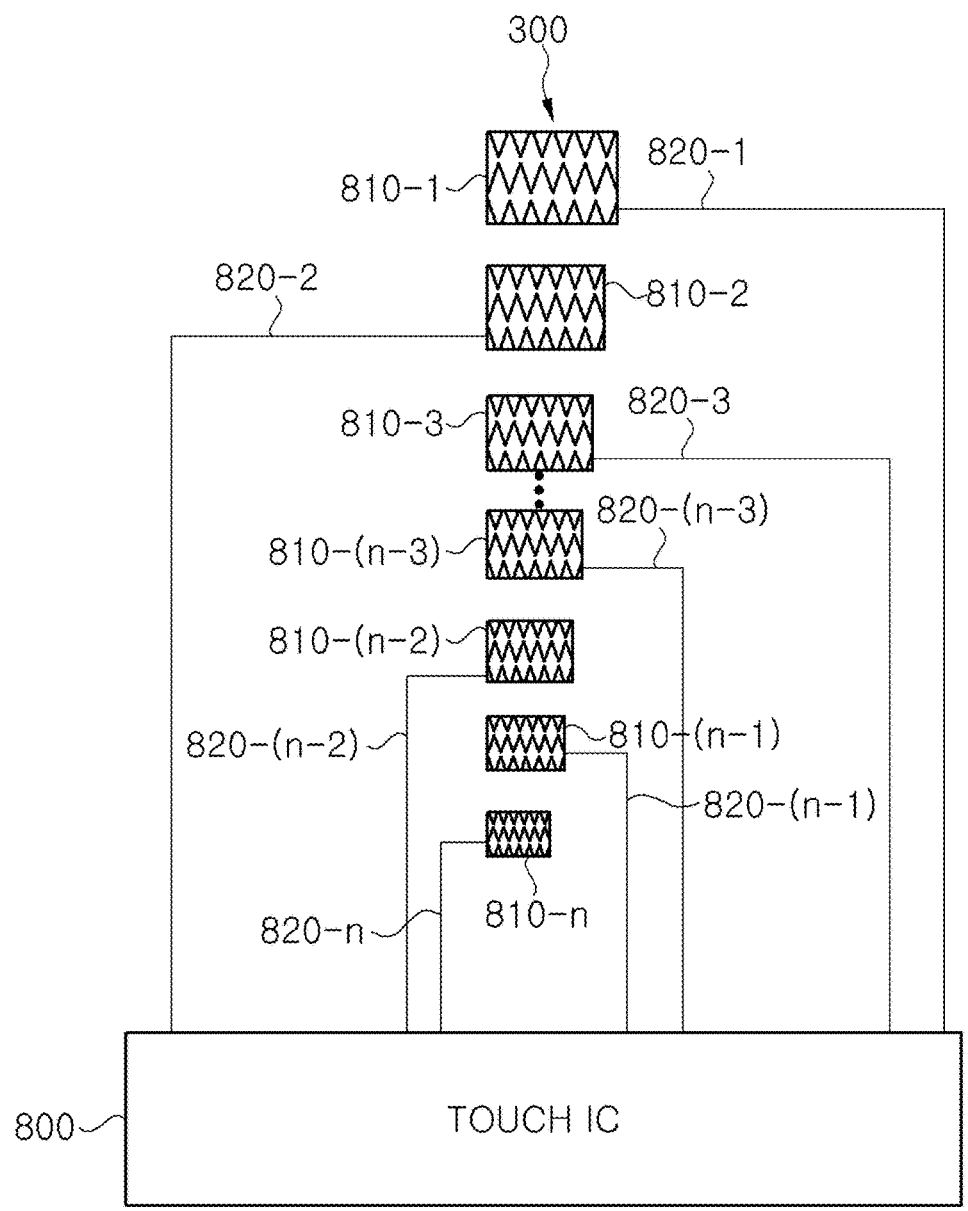

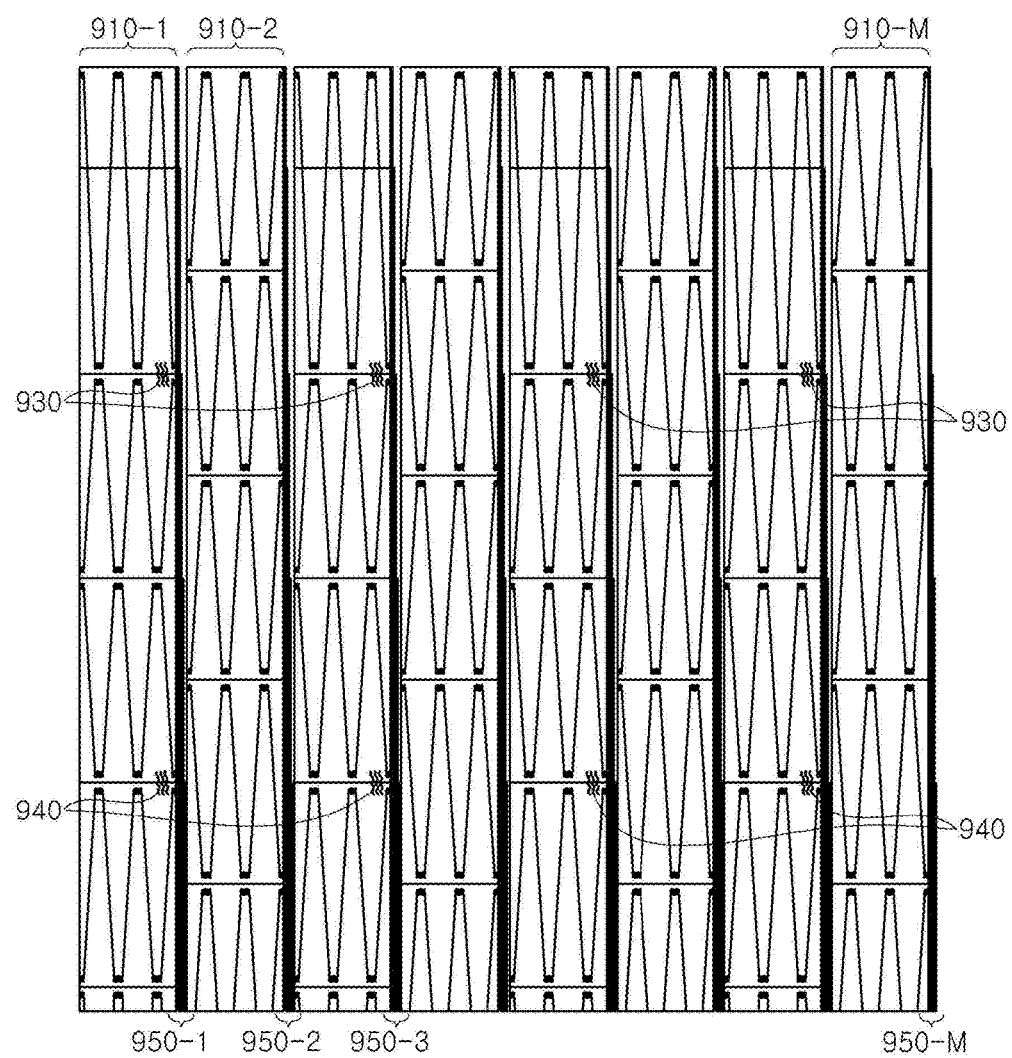
[FIG 9]

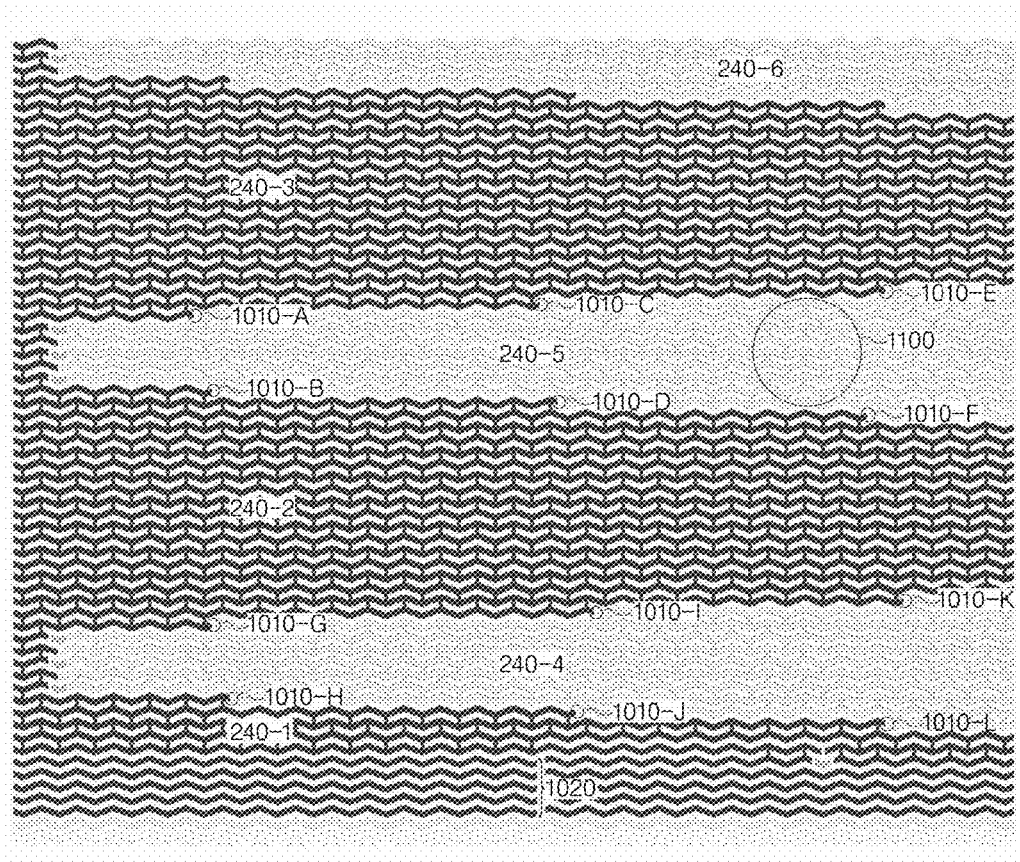
[FIG 10]

[FIG 11]
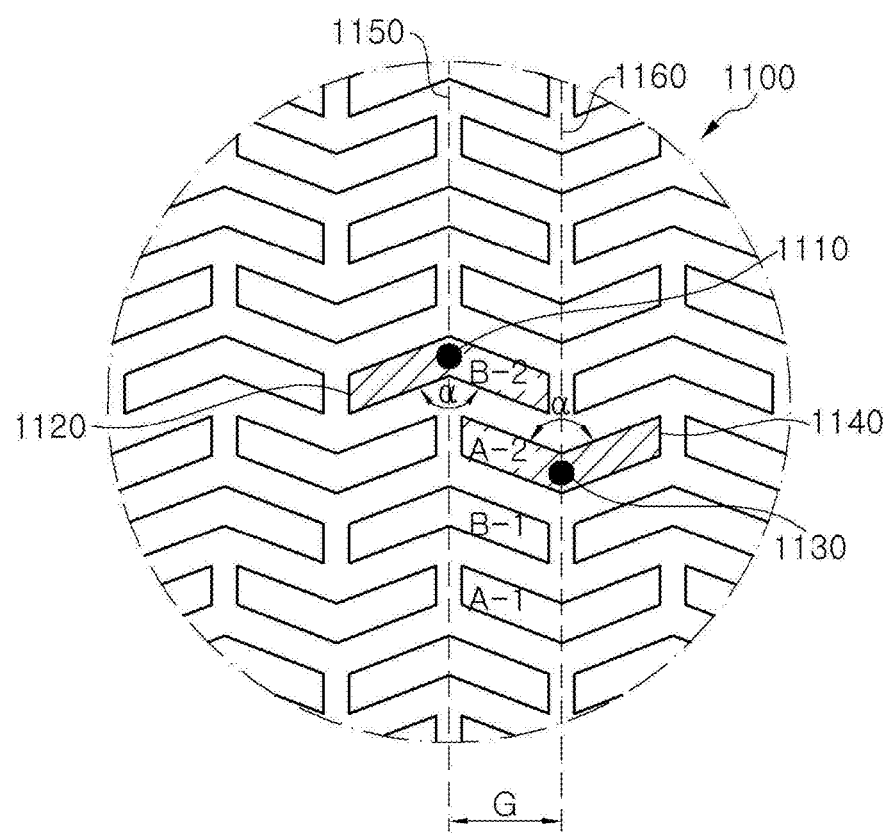

[FIG 12]
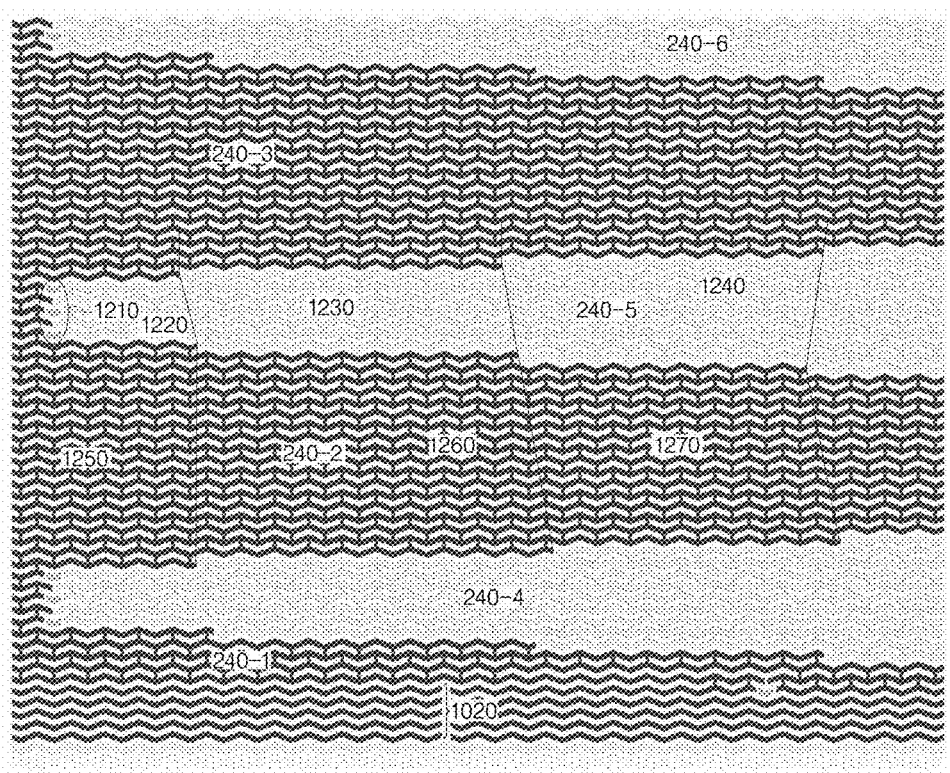

【FIG 13】
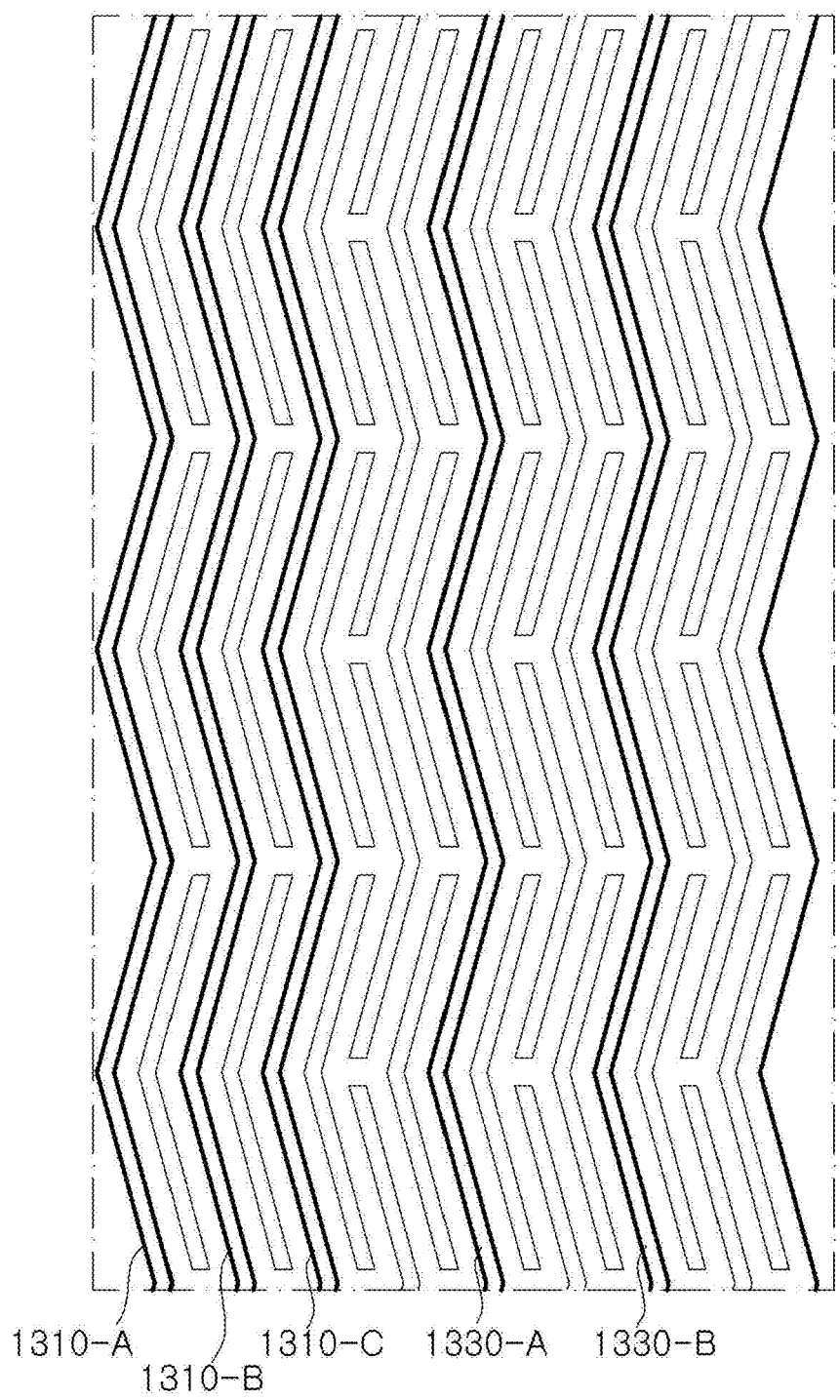
1310-A  1310-C  1330-A  1330-B
   1310-B

TOUCH PANEL INCLUDING MICRO-PATTERNS FOR IMPROVEMENT OF VISIBILITY

CROSS-REFERENCE TO RELATED APPLICATIONS

This application claims priority from and the benefit of Korean Patent Application No. 10-2015-0095748, filed on Jul. 6, 2015, which is hereby incorporated by reference for all purposes as if fully set forth herein.

BACKGROUND

Field

The present invention relates to touch panel capable of detecting a capacitive touch input of a finger of a human body or a touch input tool having conduction characteristics similar to those of the finger, and more particularly, to improving visibility of a touch panel by repetitively patterning touch patterns having a predetermined shape to improve invisibility of touch patterns.

Discussion of the Background

In general, a touch panel, which is attached onto a display apparatus such as a liquid crystal display (LCD), a plasma display panel (PDP), an organic light emitting diode (OLED), an active matrix organic light emitting diode (AMOLED), or the like, is one of the input apparatuses generating a signal corresponding to a touch position when the touch panel is touched by an object such as a finger, a pen, or the like. The touch panel has been used in various fields such as a small portable terminal, an industrial terminal, a digital information device, and the like, and use fields of the touch panel have increased.

FIGS. 1A to 1C are views illustrating examples of touch patterns of capacitive touch panels according to the related art.

The capacitive touch panel indicates a device generating a predetermined capacitance between a finger of a human body or a touch input tool having conduction characteristics similar to those of the finger and a touch pattern (a conductive material) of the touch panel and deciding whether or not a touch is made on the basis of a change in a voltage applied to the generated capacitance.

As a resolution of the touch panel required in a smart phone, or the like, is increased, the touch pattern constituting the touch panel has become more elaborate and has been diversified in order to accurately and rapidly decide a touch position.

The patterns of the touch panels illustrated in FIGS. 1A to 1C, which illustrate examples of the capacitive touch patterns according to the related art, had a structure in which two pieces 110a and 110b face each other to form one unit pattern 100 (see FIG. 1A) or one unit pattern is formed using entire one figure shape 120 or 140 (see FIGS. 1B and 1C).

The touch panels according to the related art illustrated in FIGS. 1A to 1C are manufactured to decrease sizes themselves of unit patterns 100, 120, and 140 on demand of the touch panels, thereby making it possible to increase a resolution. However, as the sizes of the unit patterns are decreased, the number of touch signal lines connected to the unit patterns is exponentially increased.

As the number of touch signal lines is increased, an area occupied by the touch signal lines in the touch panel is increased, which may not be preferable in entire performance of the touch panel.

In addition, since a size of a touch panel for a smart phone or a size of a touch panel for a laptop computer are completely different from each other, a problem that shapes themselves of the unit patterns rather than the sizes of the unit patterns should be again designed depending on sizes or purposes of the touch panels may occur.

It is not preferable to differently design the shapes themselves of the unit patterns for each touch panel since driving schemes of touch integrated chips (ICs) deciding whether or not a touch is made should be differently programmed for each touch panel.

In addition, since the touch patterns disposed in a matrix form are extended from top side to bottom side of each column, the number of sensor signal lines is further increased toward a bottom portion at which the touch IC is positioned, such that an entire disposition region occupied by the sensor signal lines becomes larger in a lateral direction. Therefore, at the bottom portion closely positioned from the touch IC, there was the problem that the sensor signal lines are displayed to the outside by a color distinguished from that of the touch patterns.

BRIEF SUMMARY OF THE INVENTION

An object of the present invention is to provide a touch screen panel capable of obtaining invisibility of touch pattern and having improved visibility by forming a plurality of micro-patterns in touch patterns and sensor signal lines so that a region in which the touch patterns are disposed and a region in which the sensor signal lines are disposed are not separately displayed.

According to an aspect of the present invention, a touch panel having improved invisibility of touch pattern includes: a plurality of first patterns formed of a transparent conductive material so as to generate a touch capacitance Ct by approach or a touch of a touch units and formed by connecting one or more second patterns having a rhombus shape to each other, surfaces of the second patterns including a plurality of micro-patterns that are repetitively patterned; and a plurality of sensor signal lines repetitively patterned with the micro-patterns and transferring touch signals generated from the first patterns to a touch integrated chip (IC).

The micro-pattern may have a predetermined shape, and the transparent conductive material on an inner surface of the shape may be removed.

A maximum width of the second pattern may be smaller than a unit pi ($\Phi$).

The unit pi may be set up to 1 mm or less.

The micro-patterns may have first inequality sign shapes or second inequality sign shapes of which two segments having a predetermined width contact each other at central points at a predetermined angle.

The first inequality sign shape and the second inequality sign shape may be inequality sign shapes having a phase difference of 180 degrees therebetween, such that they are widened in opposite directions.

The micro-patterns on the surfaces of the second patterns may be formed by repetitively patterning the first inequality sign shapes at predetermined spacings in a first line and repetitively patterning the second inequality sign shapes at predetermined spacings in a second line, and the first line in which the first inequality sign shapes are patterned and the second line in which the second inequality sign shapes are patterned may be repetitively disposed on the surfaces of the second patterns.

The first line may be a virtual line connecting the central points of the first inequality sign shapes to each other, and the second line may be a virtual line connecting the central points of the second inequality sign shapes to each other.

The micro-patterns may be repetitively patterned so that one of the segments constituting the first inequality sign shapes and one of the segments constituting the second inequality sign shapes are alternately disposed in a space of the first line and the second line.

The second patterns may be formed in the rhombus shape by including a plurality of increase regions of which widths become stepwise wide from a first vertex up to a point at which a width between second and third vertices facing each other are the maximum and a plurality of decrease regions of which widths become stepwise narrow from the point at which the width between the second and third vertices facing each other are the maximum up to a fourth vertex facing the first vertex.

A first region of the increase regions including the first vertex may include a plurality of first lines and second lines, and a plurality of first inequality sign shapes and second inequality sign shapes may be patterned in the first lines and the second lines, respectively.

The numbers of first lines and second lines included in a second region of the increase regions having widths wider than that of the first region may be more than the numbers of first lines and second lines included in the first region, and the numbers of first inequality sign shapes and second inequality sign shapes patterned in the first lines and the second lines of the second region may be more than the numbers of first inequality sign shapes and second inequality sign shapes patterned in the first lines and the second lines of the first region.

The touch panel having improved visibility may further include a plurality of connection micro-patterns connecting edges of the increase regions and edges of the decrease regions having different widths to each other, wherein the micro-patterns positioned on the respective sides of the rhombus shape and the connection micro-patterns are connected to each other to form edges of the second patterns.

Shapes in which a pair of first patterns are engaged with each other at upper and lower portions in a state in which phases of the pair of first patterns are inversed by 180 degrees may be repetitively disposed to form one column of the touch panel.

Sizes of the second patterns may become larger as the second patterns become farther from the touch IC.

The touch panel having improved visibility may further include a plurality of compensation patterns compensating for the transparent conductive material removed from vertex portions of the first patterns at which the pair of first patterns are engaged with each other.

Widths of the sensor signal lines may become wider when the first patterns to which the sensor signal lines are connected become farther from the touch IC.

Neighboring sensor signal lines may be separated from each other by separation lines from which the transparent conductive material is removed by connecting the micro-patterns formed in the same column to each other.

The meaning that the widths of the sensor signal lines become wider may be that the number of micro-patterns included in the neighboring separation lines is increased.

The sensor signal lines may be connected to the first patterns at points at which distances between the sensor signal lines and the touch IC are the shortest distances.

Widths of the sensor signal lines and sizes of the first patterns may be set so that all of resistance values of the respective sensor signal lines are the same as each other.

The transparent conductive material may be any one of indium tin oxide (ITO), carbon nano tube (CNT), antimony doped tin oxide (ATO), and indium zinc oxide (IZO).

The touch capacitance (Ct) may be several femto Farads (fF) to several ten micro Farads (pF).

BRIEF DESCRIPTION OF THE DRAWINGS

FIGS. 1A to 1C are views illustrating examples of touch patterns of capacitive touch panels according to the related art.

FIG. 2A is a plan view illustrating structures of first patterns (unit patterns) of a touch panel according to an exemplary embodiment of the present invention.

FIG. 2B is a plan view illustrating second patterns constituting the first pattern of FIG. 2A.

FIG. 3 is a view schematically illustrating a structure of an M×N matrix touch panel according to an exemplary embodiment of the present invention.

FIGS. 4A and 4B are enlarged views of touch patterns according to the present invention, wherein FIG. 4A is a view illustrating shapes of the respective sides of the second patterns, and FIG. 4B is a view illustrating shapes of micro-patterns for improving invisibility of the touch patterns.

FIGS. 5A to 5C are views schematically illustrating a change in shapes of touch patterns depending on an increase in a resolution according to an exemplary embodiment of the present invention.

FIG. 6 is a view illustrating an example of a structure of a touch panel according to the present invention.

FIG. 7 is an enlarged view of connection portions between touch patterns and sensor signal lines according to the present invention.

FIGS. 8A and 8B are views schematically illustrating modified examples of layouts of sensor signal lines according to the present invention.

FIG. 9 is a view schematically illustrating a touch panel including the equivalent resistance region according to the present invention.

FIG. 10 is a plan view illustrating micro-pattern structures for visibility in the touch panel according to the present invention.

FIG. 11 is a partially enlarged plan view of FIG. 10.

FIG. 12 is a view for describing structures of first patterns including repetitive patterning of micro-patterns for improving visibility of the touch panel according to the present invention.

FIG. 13 is a view for describing structures of sensor signal lines including repetitive patterning of micro-patterns for improving visibility of the touch panel according to the present invention.

DETAILED DESCRIPTION OF THE ILLUSTRATED EMBODIMENTS

In order to sufficiently understand the present invention, operational advantages of the present invention, and objects accomplished by exemplary embodiments of the present invention, the accompanying drawings illustrating exemplary embodiments of the present invention and contents described in the accompanying drawings should be referred to.

Hereinafter, exemplary embodiments of the present invention will be described in detail with reference to the accompanying drawings. Like reference numerals proposed in each drawing denote like components.

Hereinafter, exemplary embodiments of the present disclosure will be described in detail with reference to the accompanying drawings.

A touch panel in the present invention, which indicates a capacitive touch panel, means a device generating a predetermined capacitance between a finger of a human body or a touch input tool having conduction characteristics similar to those of the finger and a touch pattern of the touch panel and deciding whether or not a touch is made on the basis of a change in a voltage applied to the generated capacitance.

A high resolution in the present invention, which means a small touch diameter (for example, a unit pi (1 mm)) of a touch input means, means a resolution required in order to accurately read a written character in the case of writing and inputting the character using an input tool such as a touch pen.

A touch pattern in the present invention may be formed of a conductive material to thereby be called a touch electrode.

Improvement of visibility of the touch panel in the present invention should be widely interpreted as concepts including improvement of invisibility of the touch pattern and improvement of a moiré phenomenon. That is, the improvement of the visibility of the touch panel is to prevent a screen from being blurred or prevent a case in which a touch pattern is recognized when a user operates a device.

The invisibility of the touch pattern in the present invention indicates a property disabling the user to recognize a shape of a touch pattern or a touch electrode formed on the touch panel.

FIG. 2A is a plan view illustrating structures of first patterns (unit patterns 200-1 or 200-2) of a touch panel according to an exemplary embodiment of the present invention.

Each column of the touch panel is formed by repetitively disposing shapes in which a first pattern 200-1 and a first pattern 200-2 are engaged with each other at upper and lower portions in a state in which phases of the first pattern 200-1 and the first pattern 200-2 are inversed by 180 degrees, as illustrated in FIG. 2A.

Although an entire shape of the touch panel will be described in more detail with reference to FIG. 6, a unit pattern of the touch panel is the first pattern 200-1 or 200-2 in FIG. 2A. The unit pattern in the present invention indicates a touch pattern connected to one sensor signal line.

As described above, shapes in which two first patterns are engaged with each other in a state in which the left and the right of the two first patterns are reversed are repetitively disposed in an arrow direction 210, that is, a longitudinal direction to form one column. In addition, a plurality of columns formed in the above-mentioned scheme are repetitively disposed, such that the touch panel according to an exemplary embodiment of the present invention is formed.

In detail, shapes in which vertices of a pair of unit patterns (first patterns 200-1 and 200-2) are engaged with each other are repetitively disposed to form one column.

The respective first patterns, which are formed of a conductive material, may generate a touch capacitance Ct by approach or a touch of a touch units. The touch capacitance generated by the approach or the touch of the touch units is in a range of several femto Farads (fF) to several ten micro Farads (ρF).

In the present invention, sensor signal lines 320 (see FIG. 3) as well as the first pattern 200-1 or 200-2 are also formed of a transparent conductive material. An example of the transparent conductive material is any one of indium tin oxide (ITO), carbon nano tube (CNT), antimony doped tin oxide (ATO), and indium zinc oxide (IZO).

Since the first pattern 200-1 and the first pattern 200-2 are different unit patterns, they are connected to different sensor signal lines to transfer a received touch signal to a touch integrated circuit (IC).

The touch IC indicates a device detecting whether or not a touch is made and a touch point on the basis of the touch signal received through the sensor signal lines. The touch IC is generally disposed in an outer edge region of the touch panel, and a detailed position of the touch IC may be changed depending on a purpose or a size of the touch panel.

FIG. 2B is a plan view illustrating second patterns constituting the first pattern of FIG. 2A.

As illustrated in FIG. 2B, the respective first patterns 200-1 or 200-2 are formed by connecting one or more second patterns to each other.

In detail, the first pattern 200-1 is formed by connecting second patterns 240-1, 240-2, and 240-3 to each other, and the first pattern 200-2 is formed by connecting second patterns 240-4, 240-5, and 240-6 to each other.

A process of forming the unit patterns illustrated in FIG. 2B is only an example, and the number of second patterns forming the first pattern may be changed depending on a purpose or a size of the touch panel.

In addition, although the case in which the respective first patterns are formed by connecting 2.5 second patterns to each other has been illustrated in FIG. 2B, the number of second patterns constituting the first pattern is varied (for example, 3, 3.5, 4, 4.5, or the like) depending on a resolution.

The second patterns constituting the first pattern, which is the unit pattern as described above, have a rhombus shape.

0.5 second pattern in the 2.5, 3.5, or 4.5 second patterns described above indicates a half of the pattern 240-2 such as the pattern 240-1 and the pattern 240-6. That is, the 0.5 pattern indicates a half region generated by dividing a rhombus shape by ½ in the arrow direction 210.

The first pattern may be formed by connecting integer (one or more) second patterns to each other, but is not limited thereto. That is, the first pattern may also be formed by connecting one or more second patterns and a portion (for example, 0.5) of the second pattern to each other, as described above.

It is obvious to those skilled in the art that the second pattern in the present invention is not limited to having the rhombus shape, but may also have another shape. However, in the case in which the second pattern has the rhombus shape or a diamond shape as in the present invention, a touch position may be more easily detected due to an area difference between the pattern 200-1 and the pattern 200-2 as illustrated by a circle 250.

One or more second patterns are connected to each other to form the first pattern, which is the unit pattern, regardless of a detailed shape of the second patterns, and shapes in which a pair of first patterns are engaged with each other at upper and lower portions in a state in which phases of the pair of first patterns are inversed by 180 degrees are repetitively disposed to form one column of the touch panel.

A maximum width of the second pattern 240-2 is smaller than a unit pi (Φ) (for example, 1 mm). In other words, in an example of FIG. 2A, a diameter of a circle 250 or 260 is smaller than the unit pi.

Detection of a touch point in the capacitive touch panel in the present invention is performed using a voltage difference, for example at the circle (250 or 260), between a voltage at a time in which a touch is occurred and a voltage at a time in which the touch is not occurred.

FIG. 3 is a view schematically illustrating a structure of an M×N matrix touch panel according to an exemplary embodiment of the present invention.

A touch IC 340 deciding whether or not a touch is made is disposed at an opposite downstream side to an arrow direction 210 illustrated in FIG. 3.

In FIG. 3, a first pattern, which is a unit pattern of touch patterns, has the same structure as that of the first pattern 200-1 or 200-2 of FIGS. 2A and 2B.

Although the touch patterns are illustrated in FIG. 3 as if patterns 300-1 and 300-2 neighboring to each other are disposed to have a predetermined spacing therebetween, they are illustrated in order to facilitate the understanding of an entire change in sizes of the touch patterns and a change in sensor signal lines in the entire touch panel, and a spacing is not necessarily required between neighboring patterns forming one column (see FIG. 6).

As illustrated in FIG. 3, a size of a first pattern 300-1 disposed at the longest distance from the touch IC 340 is larger than that of a first pattern 300-n disposed at the nearest distance from the touch IC 340.

In an exemplary embodiment of the present invention, entire sizes of the first patterns become larger along the arrow direction 210. That is, in detail, a size of the touch pattern 300-n disposed at the nearest distance from the touch IC 340 is smaller than that of the touch pattern 300-1.

In detail, the meaning that the entire sizes of the first patterns become larger is that widths of the second patterns constituting the first patterns become larger and the number of second patterns constituting the first patterns is increased.

The increase in the number of second patterns may be used in order to decrease a size of the unit pi (for example, 1 mm) for the purpose of a high resolution, but in the case in which the sizes of the first patterns are changed depending on a distance from the touch IC 340, widths of the second patterns are varied.

As the sizes of the first patterns become larger along the arrow direction 210 or become larger depending on the distance from the touch IC 340, widths of signal lines 320 also become larger. Although not visually clearly illustrated in FIG. 3, a width of a signal line 320-1 is larger than that of a signal line 320-n.

A change in the sizes of the touch patterns and a change in the widths of the sensor signal lines illustrated in connection with FIG. 3 are to compensate for resistance loss experienced as touch signals are transferred along the sensor signal lines.

The reason why the change in the sizes of the touch patterns and the change in the widths of the sensor signal lines described in connection with FIG. 3 will be described using an extreme example.

For example, assume that a voltage change generated in the first pattern 300-n was a touch threshold voltage that may be recognized as the touch. In the case in which the same touch threshold voltage is generated in the first pattern 300-1, a signal amplitude of the voltage generated in the first pattern 300-1 is decreased due to a resistance of the sensor signal line while the voltage being transferred along the sensor signal line 320-1, such that the touch IC does not ultimately recognize the touch in the first pattern 300-1.

As a result, even though the touch having the same magnitude is generated in the first pattern 300-1 and the first pattern 300-n, the touch IC senses that the touch was generated in the first pattern 300-n, but an error that the touch IC senses that the touch was not generated in the first pattern 300-1 may occur.

Therefore, in the present invention, in order to solve a problem that it is recognized that the touch was generated in any touch pattern and was not generated in another touch pattern with respect to the same touch, the widths of the sensor signal lines connected to the patterns as well as the sizes of the unit patterns are changed (the widths of the sensor signal lines as well as the widths of the second patterns are increased) in consideration of the distance from the touch IC.

The widths of the sensor signal lines and the sizes of the first patterns are set as described above in order to allow resistance values of the respective sensor signal lines to be the same as each other.

In addition, as the widths of the sensor signal lines are increased, spacings between the sensor signal lines are also increased.

The sensor signal lines in the present invention are patterned and formed as a plurality of micro-patterns 440-1 to 440-4, similar to the touch patterns.

However, in order to distinguish neighboring sensor signal lines from each other, the micro-patterns from which a transparent conductive material is removed are continuously connected to each other along separation lines 430. Three separation lines (430) for distinguishing the sensor signal lines from each other are illustrated in FIG. 4A.

According to an exemplary embodiment of the present invention, a spacing between the separation lines (430) illustrated in FIG. 4A becomes larger as a distance from the touch IC becomes farther.

FIGS. 4A and 4B, which are enlarged views of first patterns, are views illustrating shapes of the respective sides of the first patterns and shapes of micro-patterns for improving invisibility of the touch patterns.

FIGS. 4A and 4B are enlarged views illustrating a boundary between the first pattern 200-1 and the first pattern 200-2 of FIG. 2A next to each other.

The touch patterns and the sensor signal lines according to the present invention are formed by repetitively patterning a plurality of micro-patterns 440 having the same shape in order to improve invisibility (which will be described below in detail).

In the present invention, transparent conductive materials are not deposited on and applied to an internal area of 1 or 0.5 rhombus of the second pattern, but are patterned as micro-patterns 440-1, 440-2, 440-3, or 440-4 in the internal area, as illustrated in FIG. 4B.

That is, the transparent conductive materials are repetitively removed to be the micro-patterns 440-1, 440-2, 440-3, or 440-4 having an inequality sign shape (< or >), such that the second patterns or the first patterns are formed.

The visibility considered in the present invention in connection with FIG. 4 indicates performance disabling a user to recognize that the touch patterns such as the first patterns 200-1 or 200-2 are formed on the touch panel.

The respective sides of the rhombus of the second pattern are formed in a zigzag shape by repetitive patterning of the micro-patterns of FIG. 4B. The respective sides 410 of the rhombus of the second pattern are formed by connecting the micro-patterns formed by removing the transparent conductive materials to each other along sides of the rhombus. The respective sides of the rhombus of the second pattern form a closed-loop region (a rhombus shape) by connecting one or more repetitive patterned micro-patterns (formed by removing the conductive materials) to each other.

Although a feature associated with the improvement of the invisibility of the touch patterns in the present invention will be described below in more detail, it becomes clear in FIGS. 4A and 4B that the respective sides of the rhombus of the second pattern are not smooth, but have the zigzag shape by the repetitive patterning of the micro-patterns 440-1, 440-2, 440-3, or 440-4.

In addition, the micro-patterns in the present invention may be formed of a combination of a right inequality sign 440-1 or 440-4 and a left inequality sign 440-2 or 440-3, and included angles (included angles of sides of the inequality signs) of the respective inequality signs may be determined in connection with other characteristics of the touch panel such as light transmissivity, and the like.

FIGS. 5A to 5C are views schematically illustrating shapes of touch patterns changed depending on an increase in a resolution according to an exemplary embodiment of the present invention.

An increase in a resolution of the touch panel according to the present invention may be easily accomplished by increasing the number of second patterns included in the first pattern while decreasing sizes of the second pattern.

A pattern 200 illustrated in FIG. 5A has a shape in which a pair of first patterns 200-1 and 200-2 are engaged with each other at upper and lower portions in a state in which phases of the pair of first patterns 200-1 and 200-2 are inversed by 180 degrees.

The first pattern included in the pattern 200 may be configured to include 2.5 second patterns, as illustrated in FIG. 2B.

A pattern 510 illustrated in FIG. 5B has a shape in which 3.5 second patterns are connected to each other to form a first pattern and a pair of first patterns are engaged with each other at upper and lower portions in a state in which phases of the pair of first patterns are inversed by 180 degrees.

A pattern 520 illustrated in FIG. 5C has a shape in which 4.5 second patterns are connected to each other to form a first pattern and a pair of first patterns are engaged with each other at upper and lower portions in a state in which phases of the pair of first patterns are inversed by 180 degrees.

FIGS. 5A to 5C illustrate touch patterns on the basis of one column of a touch panel. A width of one column is not changed, and the number of second patterns is larger in FIG. 5B than in FIG. 5A and widths of the second patterns are smaller in FIG. 5B than in FIG. 5A, such that a touch panel having a higher resolution in FIG. 5B than in FIG. 5A may be formed, and the number of second patterns is larger in FIG. 5C than in FIG. 5B and widths of the second patterns are smaller in FIG. 5C than in FIG. 5B, such that a touch panel having a higher resolution in FIG. 5C than in FIGS. 5A and 5B may be formed.

As shapes of the touch patterns are changed from FIG. 5A to FIG. 5C through 5B, a resolution of the touch panel is increased, but shapes of the second patterns in the present invention are maintained as a predetermined rhombus shape without being changed. In addition, even though the resolution of the touch panel is increased, the number of sensor signal lines is not increased. The reason is that the number of first patterns, which are the unit patterns to which the sensor signal lines are connected, is constant. Since examples illustrated in FIGS. 5A to 5C include only two first patterns, only two sensor signal lines are required.

In the touch panel having the high resolution according to the present invention, as the resolution is increased, the number of sensor signal lines is not changed, and positions of the sensor signal lines are also not changed, but are constant. The reason is that the first patterns, which are the unit patterns, are maintained as they are, and the widths of the second patterns constituting the first patterns are decreased, such that the number of second patterns is increased.

In the touch panel according to the present invention, even though the resolution of the touch panel is increased, the shapes of the unit patterns are not changed, and the number of sensor signal lines is not increased, such that the touch panel may be easily modified.

In addition, the case in which a size of a touch panel is increased will be described. The touch pattern of FIG. 5C is used in a touch panel having a large size and the touch pattern of FIG. 5B or 5A is used in a touch panel having a small size, thereby making it possible to form touch panels that may detect a unit pi of touch and maintain a reference resolution.

That is, the shapes of the touch patterns according to the related art had a problem that the sizes of the unit patterns should be again designed and changed, but the touch patterns according to an exemplary embodiment of the present invention have an advantage that a touch panel having a large size while maintaining a high resolution is easily manufactured by increasing the number of second patterns.

FIG. 6 is a view illustrating an example of a structure of a touch panel according to the present invention.

FIG. 6 is a view schematically illustrating two columns in a matrix form having a plurality of columns M and a plurality of rows N.

A pair of first patterns illustrated in a first column 610 are illustrated as patterns 650-1, and a pair of first patterns illustrated in a second column 620 are illustrated as patterns 650-2.

The pattern 650-1 and the pattern 650-2 illustrated in FIG. 6 are the same as the patterns illustrated in FIG. 2A. That is, the pair of first patterns having the same shape are engaged with each other at upper and lower portions in a state in which phases thereof are inversed by 180 degrees.

A region 630 in which a sensor signal line connected to the patterns of the first column is disposed and a region 640 in which a sensor signal line connected to the patterns of the second column is disposed are illustrated. In a configuration of the touch pattern in the example illustrated in FIG. 6, the patterns of the first column 610 and the patterns of the second column 620 are disposed to be misaligned with each other so as to have a predetermined offset therebetween.

The meaning that the patterns of the first column 610 and the second column 620 illustrated in FIG. 6 are disposed to be misaligned with each other so as to have the predetermined offset therebetween will be described in detail in comparison with the touch patterns of FIG. 3.

The patterns 300-1, 300-2, or 300-n in FIG. 3 correspond to the patterns 650-1 or 650-2 in FIG. 6. As described above, the respective patterns in FIG. 3 do not require the spacing therebetween, but may be disposed to be continuously connected to each other as illustrated in FIG. 6.

The touch patterns in FIG. 3 are disposed in a matrix form, and all the touch patterns in the first column and the other columns are disposed in parallel with each other. That is, the patterns in the first column, the second column, or the other columns are disposed in a line in one row (hereinafter, this structure will be referred to as a "stripe structure").

On the other hand, in the case of the touch patterns illustrated in FIG. 6, the touch patterns 650-1 of the first column and the touch patterns 650-2 of the second column do not form one row, but are disposed to be misaligned with each other so as to have a predetermined offset therebetween. In detail, the touch patterns 650-2 of the second column are disposed to be more adjacent to the touch IC at a level below the touch patterns 650-1 of the first column (hereinafter, this structure will be referred to as a "delta structure").

The touch panel formed of the touch patterns having the delta structure according to an example of FIG. 6 may more easily detect a multi-touch as compared with the touch panel having the stripe structure.

Although the case in which the patterns have an offset depending on columns has been illustrated in an example of FIG. 6, an exemplary embodiment in which the patterns have an offset depending on rows according to a layout type between the patterns and the touch IC is also possible.

FIG. 7 is an enlarged view of connection portions between touch patterns and sensor signal lines according to the present invention.

Basically, the shorter the distances between the sensor signal lines and the touch IC, the better the sensor signal lines. The reason is that the meaning that the sensor signal lines are long is that values of sensor signals at the time of transferring the sensor signals are further weakened (that is, amplitude values become small).

Therefore, the sensor signal lines in the present invention are connected to the first patterns at points at which distances between the sensor signal lines and a touch IC 740 are the shortest distances.

The touch patterns in the present invention have a shape in which a pair of first patterns are engaged with each other in a state in which phases thereof are inversed by 180 degrees.

As illustrated in FIG. 7, a point at which a sensor signal line is connected to a first pattern 710-1 is a vertex 720 of a rhombus.

When a region in which the sensor signal line is disposed is the right of each column, a point at which a distance between the sensor signal line and the touch IC 740 at the time of connecting the sensor signal line to the first pattern 710-1 is shortest becomes the vertex 720 of the rhombus.

Meanwhile, a sensor signal line connected to the other first pattern 710-2 is connected to a vertex 730.

As described above, points at which the respective patterns and the respective sensor signal lines are connected to each other in spaces in which the sensor signal lines are disposed are changed depending on shapes of the first patterns. That is, the first pattern 710-1 is connected to the vertex 720, and the first pattern 710-2 is connected to the vertex 730.

FIGS. 8A and 8B are views schematically illustrating modified examples of layouts of sensor signal lines according to the present invention.

The sensor signal lines are not necessarily disposed at only one side in a relationship between the sensor signal lines and the touch patterns of the respective columns. That is, in FIG. 6, an example of the sensor signal line formed in a region (630 or 640) that is disposed in parallel with the touch pattern 610 or 620 of each column at the right of the touch pattern 610 or 620 of each column is illustrated.

However, FIGS. 8A and 8B illustrate an example in which sensor signal lines are simultaneously present at the left and the right of columns.

FIG. 8A conceptually illustrates one column of the touch panel. In FIG. 8A, sensor signal lines connected to touch patterns positioned more closely to a touch IC 800 are disposed at the left of the touch patterns. That is, sensor signal lines 820-(N−2), 820-(N−1), and 820-N are connected to the left of the respective touch patterns 810-(N−2), 810-(N−1), and 810-N. Sensor signal lines 820-1, 820-2, and 820-3 connected to the respective touch patterns 810-1, 810-2, and 810-3 disposed at distances distant from the touch IC 800 are disposed at the right of the respective touch patterns.

FIG. 8B illustrates another example of a layout of sensor signal lines of a touch panel. In FIG. 8B, some of the sensor signal lines are alternately disposed one by one at a first side and a second side of touch patterns. Here, the second side is an opposite side to the first side on the basis of a first pattern.

The sensor signal line 820-1 of the touch pattern 810-1 is disposed at the right of the touch pattern, the sensor signal line 820-2 of the touch pattern 810-2 is disposed at the left of the touch pattern, and the sensor signal line 820-3 of the touch pattern 810-3 is disposed at the right of the touch pattern. Similarly, the sensor signal line 820-(n−3) of the touch pattern 810-(n−3) is disposed at the right of the touch pattern, the sensor signal line 820-(n−2) of the touch pattern 810-(n−2) is disposed at the left of the touch pattern, the sensor signal line 820-(n−1) of the touch pattern 810-(n−1) is disposed at the right of the touch pattern, and the sensor signal line 820-n of the touch pattern 810-n is disposed at the left of the touch pattern.

A layout of the sensor signal lines is closely associated with a position in the touch panel in which the touch IC is disposed, and is closely associated with whether the number of touch ICs is plural or single.

Unit shapes of the respective patterns in FIGS. 8A and 8B are the same as those of the patterns 200-1 or 200-2 in FIGS. 2A and 2B. In addition, as described in an example of FIG. 3, a feature that as the touch patterns become farther from the touch IC 800, the sizes of the touch patterns become larger, such that the widths of the sensor signal lines are increased may be similarly applied to an example of FIGS. 8A and 8B.

FIG. 9 is a view schematically illustrating a touch panel including the equivalent resistance region according to the present invention.

The equivalent resistance region according to an exemplary embodiment of the present invention may be included in a region 930, a region 940, and the like, of FIG. 9 due to mainly two reasons.

As a first reason, the equivalent resistance region may be introduced in order to prevent static electricity or an overvoltage from the touch IC. That is, the equivalent resistance region is added so as to introduce any additional resistance path in order to prevent touch patterns positioned at distances close to a touch IC from being damaged due to sudden overload, or the like.

As a second reason, since lengths of fan-out parts connecting sensor signal lines connected to the respective first patterns positioned in the respective columns and the touch IC to each other are different from each other, resistance values of the sensor signal lines positioned in the respective columns are changed. The equivalent resistance region is introduced in order to compensate for changes in the resistance values of the respective sensor signal lines due to a length difference between the fan-out parts as described above. For example, when it is assumed that the touch IC is positioned in a central column, a length of a fan-out part of the central column close to the touch IC is short, and a change in a resistance value of a sensor signal line positioned in a central portion is also small. However, in the case of columns positioned at both ends that are distant from the touch IC, a length of a fan-out part is long, and changes in resistance values of sensor signal lines connected to the columns positioned at both ends are large.

That is, the equivalent resistance region is introduced in order to compensate for the changes in the resistance values of the sensor signal lines positioned in the respective columns due to the lengths of the fan-out parts.

FIG. 10 is a plan view illustrating micro-pattern structures for improving visibility of the touch panel according to the present invention.

FIG. 10 is a view illustrating micro-pattern structures repetitively patterned in order to improve invisibility with respect to the first patterns in FIGS. 2A and 2B.

FIG. 10, which is an enlarged view illustrating a shape in which a pair of first patterns are engaged with each other, illustrates a state in which the pair of first patterns rotate by 90 degrees in a counterclockwise direction.

As described above, the first pattern formed of the transparent conductive material so as to generate the touch capacitance Ct by the approach or the touch of the touch units is formed by connecting one or more second patterns having the rhombus shape to each other.

Here, a surface of the second pattern includes a plurality of micro-patterns repetitively patterned in order to improve invisibility.

Inner surfaces of the micro-patterns having an inequality sign shape are in a state in which the transparent conductive materials are removed therefrom.

That is, 0.5 second pattern 240-6, a second pattern 240-5, and a second pattern 240-4 are connected to each other to form the first pattern 200-2 of FIGS. 2A and 2B, and 0.5 second pattern 240-1, a second pattern 240-2, and a second pattern 240-3 are connected to each other to form the first pattern 200-1 of FIGS. 2A and 2B.

In FIG. 10, repetitive patterning of the micro-patterns for improving the invisibility is clearly illustrated by enlarging a region in which the first pattern 200-1 and the first pattern 200-2 of FIGS. 2A and 2B are engaged with each other.

In FIG. 10, a transparent conductive material of the first pattern 200-1 is denoted by a red color, and a transparent conductive material of the first pattern 200-2 is denoted by a yellow color. In addition, the micro-patterns are denoted by a white color, such that a state in which conductive materials are removed is illustrated.

The red color, the yellow color, and the white color in FIG. 10 are to facilitate the understanding of configurations of the first pattern, the second pattern, and the micro-pattern, and it is to be noted that they are actually transparent to light.

As described above, in the touch panel according to the present invention, the sensor signal lines as well as the first patterns and the second patterns forming the touch electrode are repetitively patterned with the same micro-patterns, thereby maximizing the invisibility of the touch patterns.

A region 1020 in FIG. 10 indicates a sensor signal line region patterned as micro-patterns. The sensor signal lines are repetitively patterned with the micro-patterns, such that the visibility is improved, and transfer touch signals generated from the first patterns connected to the touch IC.

FIG. 11 is a partially enlarged plan view of FIG. 10.

FIG. 11, which is an enlarged view of a region of a circle 1100 of FIG. 10, is a view for describing patterning of micro-patterns for improving invisibility in detail.

The second patterns and the sensor signal lines are repetitively patterned with micro-patterns to form repetitively patterned two inequality sign shapes, thereby obtaining the invisibility.

The micro-patterns have been called the inequality sign shapes for convenience, but will be described in detail with reference to FIG. 11.

The micro patterns include first inequality sign shapes 1120 or second inequality sign shapes 1140 of which two segments having a predetermined width contact each other at central points 1110 or 1130 at a predetermined angle α (see FIG. 11).

An angle at which two segments of the micro-pattern meet each other may be determined in consideration of a purpose, a size, and the like, of the touch panel. Although the case in which an angle of the first inequality sign shape 1120 and an angle of the second inequality sign shape 1140 are the same as each other is illustrated in FIG. 11, these angles may be different from each other.

As illustrated in FIG. 11, the first inequality sign shape 1120 and the second inequality sign shape 1140 are inequality sign shapes having a phase difference of 180 degrees therebetween, such that they are widened in opposite directions.

The invisibility of the touch patterns and the sensor signal lines in the present invention uses an optical illusion phenomenon of human eyes, and a structure of the patterning of the micro-patterns is very important.

As illustrated in FIG. 11, the micro-patterns according to the present invention are formed by repetitively patterning the first inequality sign shapes 1120 at predetermined spacings along a first line 1150 and repetitively patterning the second inequality sign shapes 1140 at predetermined spacings along a second line 1160.

The first line in which the first inequality sign shapes are patterned and the second line in which the second inequality sign shapes are patterned are repetitively disposed on surfaces of the second patterns, such that the invisibility is obtained.

Referring to FIG. 11, the first line 1150 is a virtual line connecting the central points 1110 of the first inequality sign shapes 1120 to each other, and the second line 1160 is a virtual line connecting the central points 1130 of the second inequality sign shapes 1140 to each other.

As seen with reference to FIG. 10, the first line 1150 and the second line 1160 are virtual lines that are not actually present.

In the present invention, in order to improve the visibility, one of the segments constituting the first inequality sign shapes and one of the segments constituting the second inequality sign shapes are alternately disposed in a space G of the first line 1150 and the second line 1160.

That is, a left segment A-1 of the second inequality sign shape, a right segment B-1 of the first inequality sign shape, a left segment A-2 of the second inequality sign shape, and a right segment B-2 of the first inequality sign shape are sequentially and alternately disposed in the space G.

FIG. 12 is a view for describing structures of first patterns including repetitive patterning of micro-patterns for improving visibility of the touch panel according to the present invention.

The second pattern illustrated in FIGS. 2A and 2B generally has the rhombus shape, which is formed by connecting quadrangles of which widths become gradually wide to each other and connecting quadrangles of which widths become gradually narrow to each other.

A second pattern 240-5 of FIG. 12 is formed by disposing quadrangles of which widths become wide, such as a first region 1220, a second region 1230, a third region 1240, and the like, so as to be connected to each other.

Increase regions in which widths of quadrangles become wide will be disposed up to a point at which two vertices of a rhombus shape facing each other have a maximum width therebetween, and a plurality of decrease regions in which widths of quadrangles become narrow will be repetitively disposed from the point at which the two vertices of the rhombus shape facing each other have the maximum width therebetween.

In a second pattern 240-2 of FIG. 12, it is illustrated that widths of quadrangles become gradually narrow from a first region 1250 toward a third region 1270 through a second region 1260.

Since the patterns according to the present invention have a shape in which a pair of first patterns are engaged with each other in a state in which phases thereof are inversed by 180 degrees, they have a shape in which a width of another pattern becomes narrow at a point at which a width of one pattern becomes wide, as illustrated in FIG. 12.

The increase regions in which the widths become wide will include more micro-patterns having an inequality sign shape, and at the same time, the number of lines connecting central points of the micro-patterns to each other will also be increased.

The first region 1220 including one vertex of the second pattern 240-5 includes three first lines in which two micro-patterns having a first inequality sign shape are patterned and three second lines in which two micro-patterns having a second inequality sign shape are patterned.

As described above, the first lines in which the micro-patterns having the first inequality sign shape are patterned and the second lines in which the micro-patterns having the second inequality sign shape are patterned are not lines that are actually present, but are virtual lines that connect central points of the inequality sign shapes to each other.

The second region 1230 of the second pattern 240-5 includes nine first lines in which three micro-patterns having a first inequality sign shape are patterned and nine second lines in which three micro-patterns having a second inequality sign shape are patterned.

The third region 1240 of the second pattern 240-5 includes nine first lines in which four micro-patterns having a first inequality sign shape are patterned and nine second lines in which four micro-patterns having a second inequality sign shape are patterned.

The present invention includes a plurality of connection micro-patterns 1010-A, 1010-B, 1010-C, 1010-D, 1010-E, 1010-F, 1010-G, 1010-H, 1010-I, 1010-J, 1010-K, 1010-L, and the like, (see FIG. 10) connecting edges of the increase regions and edges of the decrease regions having different widths to each other.

The rhombus shape of the second pattern in the present invention is formed by connecting a plurality of micro-patterns positioned on the respective sides of the rhombus shape and the connection micro-patterns having different widths to each other, as illustrated in FIGS. 10 and 12.

In detail, two sides that are in parallel with each other among several quadrangles having different widths are continuously connected to each other so that widths thereof become gradually wide or narrow (that is, micro-patterns formed by removing the transparent conductive materials are connected to each other) to obtain the rhombus shape of the second pattern.

In FIG. 12, compensation patterns 1210 denoted by a blue color are further included.

The compensation patterns 1210 serve to fill the excessively removed conductive materials.

In the case in which voids are formed by excessively removing the conductive materials in a first vertex region of the second pattern 240-5, the compensation patterns filling the conductive materials having the inequality sign shape are formed in the corresponding region.

The compensation patterns 1210 illustrated in FIG. 12 are not present in only a vertex portion of the second pattern, but may be appropriately additionally disposed when a void area is larger as compared with other portions.

It may be confirmed in FIG. 12 that additional compensation patterns are formed in a first vertex portion of the second pattern 240-4 and the sensor signal line region.

FIG. 13 is a view for describing structures of sensor signal lines including repetitive patterning of micro-patterns for improving visibility of the touch panel according to the present invention.

FIG. 13 is an enlarged view of repetitive patterning of micro-patterns for improving invisibility in sensor signal lines, that is, an enlarged view of the region 1020 of FIG. 12.

In the present invention, the sensor signal lines as well as the first patterns and the second patterns forming the touch electrode are also repetitively patterned with the micro-patterns having the inequality sign shape, thereby improving the visibility of the touch panel.

Separation lines 1310-A, 1310-B, 1310-C, 1330-A, and 1330-B illustrated in FIG. 13 continuously connect patterns having an inequality sign shape to each other without a gap to separate neighboring sensor signal lines from each other.

A first sensor signal line including one micro-pattern having a first inequality sign shape, disposed at the leftmost portion in FIG. 13 is separated from sensor signal lines neighboring to the first sensor signal line by the separation lines 1310A and 1310-B.

A second sensor signal line having the same width, that is, including one micro-pattern having a first inequality sign shape is separated from the first sensor signal line and a third sensor signal line neighboring to the second sensor signal line by the separation lines 1310B and 1310-C.

The third sensor signal line including two micro-patterns having a first inequality sign shape and one micro-pattern having a second inequality sign shape is separated from the second sensor signal line and a fourth sensor signal line neighboring to the third sensor signal line by the separation lines 1310C and 1330-A.

The fourth sensor signal line including two micro-patterns having a first inequality sign shape and one micro-pattern having a second inequality sign shape is separated from the third sensor signal line and a fifth sensor signal line neighboring to the fourth sensor signal line by the separation lines 1330-A and 1330-B.

As seen from FIG. 13, the meaning that widths of the sensor signal lines become wide is that the number of micro-patterns included in the neighboring separation lines is increased.

As described above, the widths of the sensor signal lines become wider when the first patterns to which the sensor signal lines are connected become farther from the touch IC.

In a touch panel having touch patterns and sensor signal lines formed of a plurality of micro-patterns according to an exemplary embodiment of the present invention, it is possible to maximize invisibility while minimizing a change in structures of the touch patterns depending on a purpose of the touch panel. Therefore, finally, it is possible to promote improvement of visibility of the touch panel.

In the touch panel having touch patterns and sensor signal lines formed of a plurality of micro-patterns according to an exemplary embodiment of the present invention, micro-patterns for invisibility of patterns are not changed even though sizes of touch patterns are changed.

It will be obvious to those skilled in the art to which the present invention pertains that the present invention is not limited to the above-mentioned exemplary embodiments and the accompanying drawings, but may be variously substituted, modified, and altered without departing from the scope and spirit of the present invention.

What is claimed is:

1. A touch panel having improved visibility, comprising:
   a plurality of first patterns formed of a transparent conductive material so as to generate a touch capacitance by approach or a touch of a touch unit and formed by connecting one or more second patterns having a rhombus shape to each other, surfaces of the second patterns including a plurality of micro-patterns that are repetitively patterned; and
   a plurality of sensor signal lines repetitively patterned with the micro-patterns and transferring touch signals generated from the first patterns to a touch integrated chip (IC),
   wherein each of the micro-patterns has a predetermined shape, and the transparent conductive material on an inner surface of the shape is removed, and
   wherein neighboring sensor signal lines are separated from each other by separation lines from which the transparent conductive material is removed by connecting the micro-patterns formed in the same column to each other.

2. The touch panel having improved visibility of claim 1, wherein a maximum width of the second pattern is smaller than a unit pi ($\Phi$), wherein the unit pi is set up to 1 mm or less.

3. The touch panel having improved visibility of claim 1, wherein the micro-patterns have first inequality sign shapes or second inequality sign shapes of which two segments having a predetermined width contact each other at central points at a predetermined angle.

4. The touch panel having improved visibility of claim 3, wherein the first inequality sign shape and the second inequality sign shape are inequality sign shapes having a phase difference of 180 degrees therebetween, such that they are widened in opposite directions.

5. The touch panel having improved visibility of claim 3, wherein the micro-patterns on the surfaces of the second patterns are formed by repetitively patterning the first inequality sign shapes at predetermined spacings in a first line and repetitively patterning the second inequality sign shapes at predetermined spacings in a second line, and
   the first line in which the first inequality sign shapes are patterned and the second line in which the second inequality sign shapes are patterned are repetitively disposed on the surfaces of the second patterns.

6. The touch panel having improved visibility of claim 5, wherein the first line is a virtual line connecting the central points of the first inequality sign shapes to each other, and the second line is a virtual line connecting the central points of the second inequality sign shapes to each other.

7. The touch panel having improved visibility of claim 5, wherein the micro-patterns are repetitively patterned so that one of the segments constituting the first inequality sign shapes and one of the segments constituting the second inequality sign shapes are alternately disposed in a space of the first line and the second line.

8. The touch panel having improved visibility of claim 5, wherein the second patterns are formed in the rhombus shape by including a plurality of increase regions of which widths become stepwise wide from a first vertex up to a point at which a width between second and third vertices facing each other are the maximum and a plurality of decrease regions of which widths become stepwise narrow from the point at which the width between the second and third vertices facing each other are the maximum up to a fourth vertex facing the first vertex.

9. The touch panel having improved visibility of claim 8, wherein a first region of the increase regions including the first vertex includes a plurality of first lines and a plurality of second lines, and a plurality of first inequality sign shapes and a plurality of second inequality sign shapes are patterned in the first lines and the second lines, respectively.

10. The touch panel having improved visibility of claim 9, wherein numbers of a plurality of first lines and a plurality of second lines included in a second region of the increase regions having widths wider than that of the first region are more than numbers of the plurality of first lines and the plurality of second lines included in the first region, and numbers of first inequality sign shapes and second inequality sign shapes patterned in the plurality of first lines and the plurality of second lines of the second region are more than numbers of the first inequality sign shapes and the second inequality sign shapes patterned in the plurality of first lines and the plurality of second lines of the first region.

11. The touch panel having improved visibility of claim 10, further comprising a plurality of connection micro-patterns connecting edges of the increase regions and edges of the decrease regions having different widths to each other,
   wherein the micro-patterns positioned on the respective sides of the rhombus shape and the connection micro-patterns are connected to each other to form edges of the second patterns.

12. The touch panel having improved visibility of claim 1, wherein shapes in which a pair of first patterns are engaged with each other at upper and lower portions in a state in which phases of the pair of first patterns are inversed by 180 degrees are repetitively disposed to form one column of the touch panel.

13. The touch panel having improved visibility of claim 1, wherein sizes of the second patterns become larger as the second patterns become farther from the touch IC.

14. The touch panel having improved visibility of claim 1, further comprising a plurality of compensation patterns compensating for the transparent conductive material removed from vertex portions of the first patterns at which a pair of the first patterns are engaged with each other.

15. The touch panel having improved visibility of claim 1, wherein widths of the sensor signal lines increase when the first patterns to which the sensor signal lines are connected become farther from the touch IC.

16. The touch panel having improved visibility of claim 15, wherein increasing the widths of the sensor signal lines indicates that a number of micro-patterns included in neighboring separation lines is increased.

17. The touch panel having improved visibility of claim 1, wherein the sensor signal lines are connected to the first patterns at points at which distances between the sensor signal lines and the touch IC are the shortest distances.

18. The touch panel having improved visibility of claim 15, wherein widths of the sensor signal lines and sizes of the first patterns are set so that all of resistance values of the respective sensor signal lines are the same as each other.

* * * * *